US010000158B2

(12) United States Patent
Darrow

(10) Patent No.: US 10,000,158 B2
(45) Date of Patent: Jun. 19, 2018

(54) BAG FOR STORING AND HOLDING ELECTRONIC AND NON-ELECTRONIC ITEMS

(71) Applicant: Rob Darrow, Montgomery, IL (US)

(72) Inventor: Rob Darrow, Montgomery, IL (US)

(*) Notice: Subject to any disclaimer, the term of this patent is extended or adjusted under 35 U.S.C. 154(b) by 0 days. days.

(21) Appl. No.: 15/491,646

(22) Filed: Apr. 19, 2017

(65) Prior Publication Data
US 2017/0297499 A1 Oct. 19, 2017

Related U.S. Application Data

(60) Provisional application No. 62/324,756, filed on Apr. 19, 2016.

(51) Int. Cl.
*B60R 7/04* (2006.01)
*A45C 3/00* (2006.01)
*A45C 9/00* (2006.01)
*A45C 13/04* (2006.01)
*A45C 13/10* (2006.01)
*B60N 3/10* (2006.01)
*A45C 13/00* (2006.01)

(52) U.S. Cl.
CPC ............. *B60R 7/043* (2013.01); *A45C 3/001* (2013.01); *A45C 9/00* (2013.01); *A45C 13/04* (2013.01); *A45C 13/10* (2013.01); *A45C 13/103* (2013.01); *B60N 3/10* (2013.01); *A45C 13/001* (2013.01); *A45C 2003/002* (2013.01); *A45C 2003/008* (2013.01); *A45C 2009/007* (2013.01); *A45C 2013/1015* (2013.01)

(58) Field of Classification Search
CPC .... B60R 7/043; B60R 2011/0012–2011/0017; B60R 2011/0031; B60N 3/004
USPC .......................................... 224/275, 484, 485
See application file for complete search history.

(56) References Cited

U.S. PATENT DOCUMENTS

| | | | | | |
|---|---|---|---|---|---|
| 5,354,131 A | * | 10/1994 | Mogil | .................. | A45C 7/0086 150/109 |
| 5,492,257 A | * | 2/1996 | Demick | ..................... | B60R 7/02 224/275 |
| 5,542,590 A | * | 8/1996 | Pfitzenmaier | ........... | B60R 7/043 150/102 |
| 5,603,573 A | * | 2/1997 | Mercier | ............... | A01K 1/0236 119/497 |
| 5,628,439 A | * | 5/1997 | O'Hara | .................. | B60N 3/001 108/25 |
| 5,896,962 A | * | 4/1999 | Smith | ...................... | A45C 3/00 190/107 |
| 6,234,677 B1 | * | 5/2001 | Mogil | .................. | A45C 7/0077 206/545 |
| 6,409,066 B1 | * | 6/2002 | Schneider | ................. | A45F 3/02 190/110 |

(Continued)

Primary Examiner — Brian D Nash
(74) Attorney, Agent, or Firm — RG Patent Consulting, LLC; Rachel Gilboy

(57) ABSTRACT

A bag for storing and holding electronic and non-electronic items upon the passenger seat of a vehicle is a fabric accessory holder that opens to resemble an open rectangular tray having short sidewalls with multiple interior accessory pockets each having closures, and a coffee cup holder mounted on the inside bottom. A stiffener is used to provide some rigidity to the base and the sidewalls. The sides pull together with closures such as zippers into a domed top with handles for carrying.

14 Claims, 3 Drawing Sheets

(56) References Cited

U.S. PATENT DOCUMENTS

| | | | | |
|---|---|---|---|---|
| 6,763,986 B2 * | 7/2004 | Santos | A45C 9/00 | |
| | | | 224/275 | |
| 6,935,498 B1 * | 8/2005 | Ho | A45C 3/02 | |
| | | | 190/115 | |
| 9,254,022 B2 * | 2/2016 | Meldeau | A45C 3/04 | |
| 9,307,819 B1 * | 4/2016 | Schern | A45C 11/38 | |
| 9,578,938 B1 * | 2/2017 | Verneuille | A45C 5/06 | |
| 2002/0012480 A1 * | 1/2002 | Konno | A45C 3/00 | |
| | | | 383/111 | |
| 2005/0238261 A1 * | 10/2005 | Godshaw | A45C 7/0036 | |
| | | | 383/40 | |
| 2006/0278173 A1 * | 12/2006 | Kamijo | A01K 1/0254 | |
| | | | 119/496 | |
| 2007/0131568 A1 * | 6/2007 | Georgia | A45C 13/02 | |
| | | | 206/223 | |
| 2007/0274613 A1 * | 11/2007 | Pruchnicki | A45C 7/0077 | |
| | | | 383/110 | |
| 2008/0156604 A1 * | 7/2008 | Franco | A45C 7/0095 | |
| | | | 190/1 | |
| 2014/0001001 A1 * | 1/2014 | Turpeau | A45C 3/04 | |
| | | | 190/18 A | |
| 2017/0188674 A1 * | 7/2017 | Dotey | A45C 7/0095 | |

\* cited by examiner

BAG FOR STORING AND HOLDING ELECTRONIC AND NON-ELECTRONIC ITEMS

CROSS-REFERENCE TO RELATED APPLICATION

The present application is related to and claims priority from prior provisional application Ser. No. 62/324,756, filed Apr. 19, 2016 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of accessory bags and more specifically relates to bag for storing and holding electronic and non-electronic items upon a passenger seat of a vehicle.

2. Description of the Related Art

Millions of consumers use their automobiles to drive to work, school, or to enjoy some sort of recreation. The vehicle has become an indispensable tool for going from one location to another for daily business. The commute for many people, is a long drive during which the only thing that the commuter is able to do is listen to the radio or talk if others share the ride. Because of the travel times that are necessary for many people, they become attached to some personal items such as music players, a collection of various music CDs, or various other items that help the time pass more quickly. Many items are normally carried by a person but with the addition of the aforementioned items to be used for the travel, it can become cumbersome to carry. Wallets, house keys and a cellular telephone are but a few of the countless personal items most consumers carry with them when on the go. In addition, bulky or oversize items such as an extra pair of shoes, a change of clothes, baby carriers and business samples are all often stored within one's vehicle.

Unfortunately, storing the various items needed when on the road can be a challenge. Loaded onto an empty passenger seat or piled into the trunk, these items can be difficult to access when needed and tend to create a cluttered and unkept environment. the vast array of goods utilized during travel can greatly detract from a pristine vehicle interior. In addition, when reaching a destination, retrieval of all of the personal items collected often requires more than one trip to get it into the building at the destination. This can become annoying for busy consumers because of extra time needed or trying to carry too many variously shaped objects. A solution is needed.

Various attempts have been made to solve the above-mentioned problems such as those found in U.S. Publication No. 2012/0273100 to Lovette Appleton; U.S. Publication No. 2003/0062233 to Keith Sharples; and U.S. Publication No. 2014/0001001 to Alem Turpeau. This art is representative of accessory bags. None of the above inventions and patents, taken either singly or in combination, is seen to describe the invention as claimed.

Ideally, an accessory bag should provide multi-functionality, and yet, would operate reliably and be manufactured at a modest expense. Thus, a need exists for a reliable bag for storing and holding electronic and non-electronic items upon a passenger seat of a vehicle to avoid the above-mentioned problems.

BRIEF SUMMARY OF THE INVENTION

In view of the foregoing disadvantages inherent in the known accessory bag art, the present invention provides a novel bag for storing and holding electronic and non-electronic items upon the passenger seat of a vehicle. The general purpose of the present invention, which will be described subsequently in greater detail, is to provide multi-functionality of use by functioning as an open top accessory holder while driving and then folds closed to function as a carry bag when leaving the vehicle.

The bag for storing and holding electronic and non-electronic items upon the passenger seat of a vehicle preferably comprises a main body including a foldable base portion configured and adapted to lay flat upon the passenger seat of a vehicle, four side walls pivotally connected with the base portion forming a rectangular interior volume, two handle members attached to respective opposite walls of the four side walls such that when the two handle members are pulled upwards and placed together they form a carrying handle and when the two handle members are pulled upwards and placed together the base portion and four side walls pivot and collapse with respect to one another such that the bag is adapted to retain and protect the electronic and non-electronic items therein for transporting.

A plurality of pocket members is connected to interior surfaces of the four side walls and is adapted to releasably retain electronic and non-electronic items therein. At least one cup holder connected to an interior surface of the base portion is adapted to releasably retain cups therein.

An elastic cord member is attached along top edge portions of the four side walls and an adjustable connector member is adapted to releasably connect the opposite end portions of the elastic cord member such that the elastic cord member forms an adjustable loop. When the adjustable loop is decreased in size the bag is adapted to collapse into a closed position, and when the adjustable loop is increased in size the bag is adapted to expand into an open position. The adjustable connector member includes two connector portions each respectively connected to each end portion of the elastic cord member and adapted to releasably connect to one another. The adjustable connector member includes a release button such that when pressed, the release button disconnects the two connector portions from one another and allows the bag to expand into the open position.

The pocket members are preferably formed from a mesh material and the main body is formed from a nylon material. The base portion and the four side walls are formed having interior volumes filled with material adapted to provide a degree of rigidity to the base portion and the four side walls. A foldable frame may be connected with the base portion and the four side walls to provide a degree of rigidity to the bag when it is in an open position, and also to provide a degree of rigidity to the bag when it is in a closed position. The foldable frame may be formed from a metal material but could also be formed from other materials that are as flexible as rope. If formed from rope, it may be formed from a nylon material or a cotton material.

When the main body is in an open position, it has a length between 2 and 2½ feet, a width between 1 and 1½ feet, and a height of 1 to 1½ feet. The pocket members include releasable fasteners to releasably open and close the pocket members to securely hold items within. The releasable fasteners may be formed as zipper members or may be formed from hook and loop material.

The present invention holds significant improvements and serves as a bag for storing and holding electronic and non-electronic items upon a passenger seat of a vehicle. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, bag for storing and holding electronic and non-electronic items upon a passenger seat of a vehicle, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to an accessory bag and more particularly to a bag for storing and holding electronic and non-electronic items upon the passenger seat of a vehicle as used to improve the multi-functionality of use by functioning as an open top accessory holder while driving and as a carry bag when leaving the vehicle.

Figure 1:
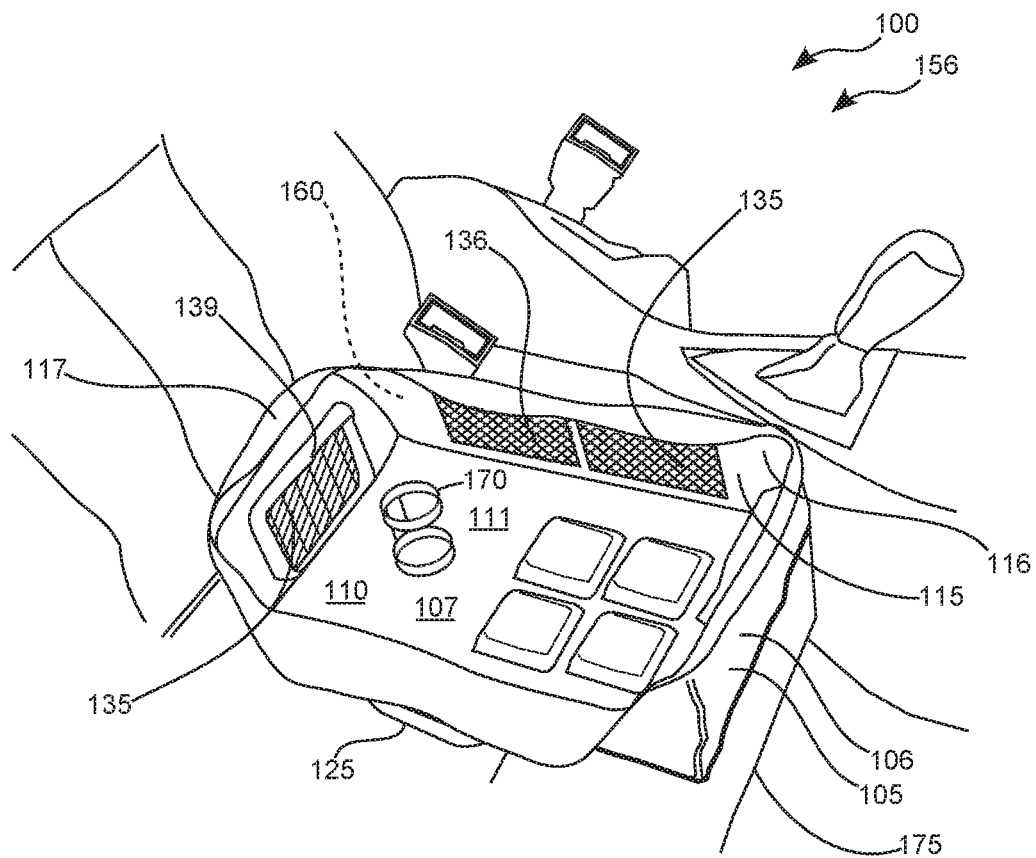
FIG. 1 shows a perspective view illustrating an in-use condition of a bag for storing and holding electronic and non-electronic items upon a passenger seat of a vehicle according to an embodiment of the present invention.

In greater detail now, referring to the drawings by numerals of reference there is shown in FIG. 1, a perspective view illustrating an in-use condition of bag for storing and holding electronic and non-electronic items 100 upon a passenger seat of a vehicle according to an embodiment of the present invention.

Bag for storing and holding electronic and non-electronic items 100 upon the passenger seat of a vehicle is a fabric accessory holder that opens to resemble an open rectangular tray having short sidewalls 115 with multiple interior accessory pocket members 135 each having releasable fasteners 137, and cup holder 170 mounted on inside bottom 111. A stiffener is used to provide some rigidity to foldable base portion 110 and sidewalls 115. Sidewalls 115 pull together with elastic cord member or zipper members 138 into a domed top 180 with handle members 125 for carrying.

Figure 2:
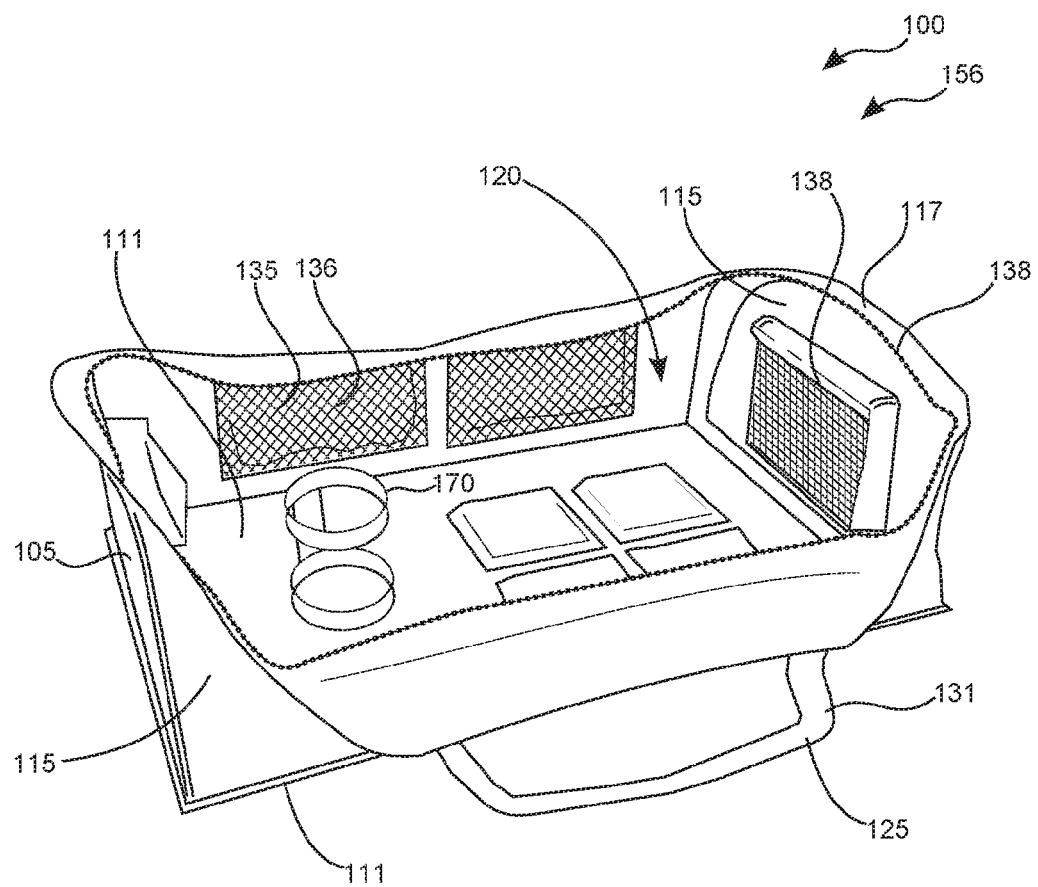
FIG. 2 is a perspective view illustrating an open position of the bag for storing and holding electronic and non-electronic items upon a passenger seat of a vehicle according to an embodiment of the present invention of FIG. 1.

Referring now to FIG. 2, a perspective view illustrating open position 156 of bag for storing and holding electronic and non-electronic items 100 upon vehicle passenger seat 175 of a vehicle according to an embodiment of the present invention of FIG. 1.

Bag for storing and holding electronic and non-electronic items 100 upon vehicle passenger seat 175 of a vehicle preferably comprises main body 105 including a foldable base portion 110 configured and adapted to lay flat upon vehicle passenger seat 175 of a vehicle, four sidewalls 115 pivotally connected with foldable base portion 110 forming a rectangular interior volume 120, two handle members 125 attached to respective opposite sidewalls 115 such that when the two handle members 125 are pulled upwards and placed together they form carrying handle 131 and when the two handle members 125 are pulled upwards and placed together foldable base portion 110 and four sidewalls 115 pivot and collapse with respect to one another such that bag for storing and holding electronic and non-electronic items 100 is adapted to retain and protect the electronic and non-electronic items therein for transporting.

A plurality of pocket members 135 is connected to interior surface 116 of the four sidewalls 115 and is adapted to releasably retain electronic and non-electronic items therein. At least one cup holder 170 connected to interior surface 116 of foldable base portion 110 is adapted to releasably retain cups therein.

Pocket members 135 are preferably formed from mesh material 136 and main body 105 is formed from nylon material 106. Base portion 107 and the four sidewalls 115 are formed having interior volume 120 filled with material adapted to provide a degree of rigidity to base portion 107 and the four sidewalls 115. Foldable frame 165 may be connected with base portion 107 and sidewalls 115 to provide a degree of rigidity to bag for storing and holding electronic and non-electronic items 100 when it is in open position 156, and also to provide a degree of rigidity to main body 105 when it is in closed position 155. Foldable frame 165 may be formed from a metal material but could also be formed from other materials that are as flexible as rope 150. If formed from rope 150, it may be formed from a nylon material, a cotton material, or elastic cord member 145.

Figure 3:
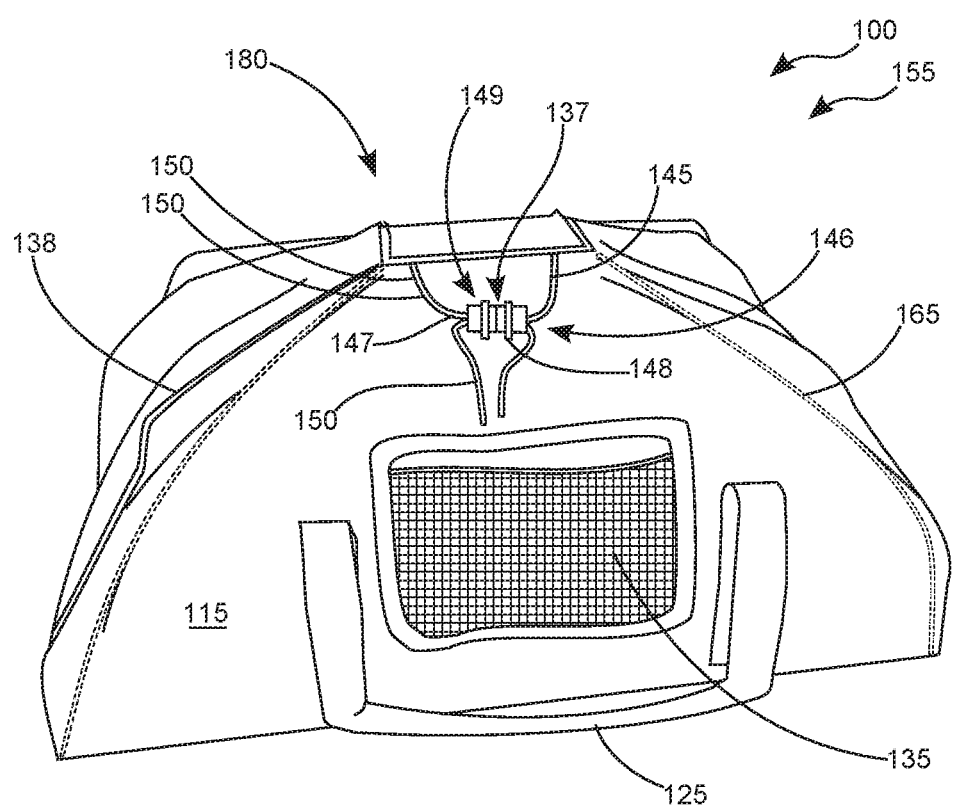
FIG. 3 is a perspective view illustrating a closed position of the bag for storing and holding electronic and non-electronic items upon a passenger seat of a vehicle according to an embodiment of the present invention of FIG. 1.

Referring now to FIG. 3, a perspective view illustrating closed position 155 of for storing and holding electronic and non-electronic items 100 upon a passenger seat of a vehicle according to an embodiment of the present invention of FIG. 1.

Elastic cord member 145 is attached along top edge portion 117 of the four sidewalls 115 and adjustable connector member 146 is adapted to releasably connect end portions 147 of elastic cord member 145 such that elastic cord member 145 forms an adjustable loop. When the adjustable loop is decreased in size bag 100 is adapted to collapse into closed position 155, and when the adjustable loop is increased in size, bag 100 is adapted to expand into open position 156. Adjustable connector member 146 includes two connector portions 149 each respectively connected to each end portions 147 of elastic cord member 145 and adapted to releasably connect to one another. Adjustable connector member 146 includes release button 148 such that when pressed, release button 148 disconnects the two connector portions 149 from one another and allows bag 100 to expand into open position 156.

When main body 105 is in open position 156, it has a length between 2 and 2½ feet, a width between 1 and 1½ feet, and a height of 1 to 1½ feet. Pocket members 135 include releasable fasteners 137 to releasably open and close pocket members 135 to securely hold items within. Releasable fasteners 137 may be formed as zipper members 138 or may be formed from hook and loop material 139.

Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed:

1. A bag for storing and holding electronic and non-electronic items upon a passenger seat of a vehicle, comprising:
    a main body including;
        a foldable base portion;
            wherein said foldable base portion is configured and adapted to lay flat upon said passenger seat of said vehicle;
        four side walls;
            wherein said four side walls are pivotally connected with said base portion;
        wherein said main body and said four side walls form a rectangular interior volume;
    two handle members;
        wherein said two handle members are attached to respective opposite walls of said four side walls, such that when said two handle members are pulled upwards and placed together they form a carrying handle; and
        wherein when said two handle members are pulled upwards and placed together the base portion and four side walls pivot and collapse with respect to one another such that said bag is adapted to retain and protect said electronic and non-electronic items therein for transporting;
    a plurality of pocket members;
        wherein said plurality of pocket members are connected to interior surfaces of said four side walls adapted to releasably retain electronic and non-electronic items therein; and
    at least one cup holder;
        wherein said at least one cup holder is connected to an interior surface of said base portion and is adapted to releasably retain cups therein;
    an elastic cord member;
        wherein said elastic cord member is attached to and along top edge portions of said four side walls; and
    an adjustable connector member;
        wherein said adjustable connector member is adapted to releasably connect to opposite end portions of said elastic cord member, such that said elastic cord member forms an adjustable loop;
        wherein when said adjustable loop is decreased in size said bag is adapted to collapse into a closed position, and wherein when said adjustable loop is increased in size said bag is adapted to expand into an open position.

2. The bag of claim 1, wherein said adjustable connector member includes two connector portions each respectively connected to an end portion of said elastic cord member and adapted to releasably connect to one another; and wherein said adjustable connector member includes a release button, such that when pressed said release button disconnects said two connector portions from one another and allows said bag to expand into said open position.

3. The bag of claim 1, wherein said plurality of pocket members are formed from a mesh material.

4. The bag of claim 1, wherein said main body is formed from a nylon material.

5. The bag of claim 4, wherein said base portion and said four side walls are formed having interior volumes filled with material therein adapted to provide a degree of rigidity to each of said base portion and said four side walls.

6. The bag of claim 1, further comprising a foldable frame connected with each of said base portion and said four side walls to provide a degree of rigidity to said bag when in an open position, and provide a degree of rigidity to said bag when in a closed position.

7. The bag of claim 6, wherein said foldable frame is formed from a metal material.

8. The bag of claim 6, wherein said foldable frame is formed from a rope material.

9. The bag of claim 8, wherein said rope is formed from a nylon material.

10. The bag of claim 8, wherein said rope is formed from a cotton material.

11. The bag of claim 1, wherein when said main body is in an open position has a length between 2 and 2½ feet, a width between 1 and 1½ feet, and a height between 1 and 1½ feet.

12. The bag of claim 1, wherein said plurality of pocket members include releasable fasteners to releasable open and close said plurality of pocket members to thereby securely hold items therein.

13. The bag of claim 12, wherein said releasable fasteners are formed as zipper members.

14. The bag of claim 12, wherein said releasable fasteners are formed from hook and loop material.

\* \* \* \* \*